(12) United States Patent
Niwa

(10) Patent No.: US 6,353,301 B1
(45) Date of Patent: Mar. 5, 2002

(54) HANDLE FEEDING CONTROL METHOD IN A NUMERICAL CONTROL APPARATUS, AND A NUMERICAL CONTROL APPARATUS

(75) Inventor: Tomomitsu Niwa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/612,483

(22) Filed: Jul. 7, 2000

Related U.S. Application Data

(63) Continuation of application No. PCT/JP98/05622, filed on Dec. 11, 1998.

(30) Foreign Application Priority Data

Feb. 5, 1998 (JP) .............................................. 10-24727
Feb. 17, 1998 (JP) .............................................. 10-34789

(51) Int. Cl.⁷ .............................................. G05B 19/18
(52) U.S. Cl. ........................ 318/569; 318/573; 318/600
(58) Field of Search ................................ 318/569, 571, 318/573, 574, 600, 603

(56) References Cited

U.S. PATENT DOCUMENTS

| | | | | |
|---|---|---|---|---|
| 5,191,538 A | * | 3/1993 | Yoneda et al. | 364/474.16 |
| 5,448,145 A | * | 9/1995 | Iwashita | 318/568.15 |
| 5,550,448 A | * | 8/1996 | Ferragina | 318/569 |
| 5,808,434 A | * | 9/1998 | Kokura et al. | 318/569 |

FOREIGN PATENT DOCUMENTS

| | | |
|---|---|---|
| JP | A 60-198606 | 10/1985 |
| JP | A 63-106007 | 5/1988 |
| JP | A-2-17506 | 1/1990 |
| JP | A-2-234203 | 9/1990 |
| JP | A 4-354683 | 12/1992 |
| JP | A. 5-31848 | 4/1993 |
| JP | A 5-341847 | 12/1993 |
| JP | A 6-226586 | 8/1994 |
| JP | A 6-324729 | 11/1994 |
| JP | A 7-24756 | 1/1995 |
| JP | A 7-104814 | 4/1995 |
| JP | A 60-160407 | 8/1995 |
| JP | A 8-339228 | 12/1996 |
| JP | A. 9-16263 | 1/1997 |

* cited by examiner

Primary Examiner—Robert E. Nappi
Assistant Examiner—Edgardo San Martin
(74) Attorney, Agent, or Firm—Sughrue Mion, PLLC

(57) ABSTRACT

In a handle feeding control method in a numerical control apparatus in which a control axis can be controlled in response to a pulse signal output from a manual pulse generator for generating the pulse signal according to the turning quantity of a manual handle so as to perform handle feeding, at least one of a movement quantity, a target position and a movement range of the control axis is set and stored; and the movement quantity or position of the control axis at the time of the handle feeding is monitored, and pulse signals from the manual pulse generator thereafter when the movement quantity or position of the control axis at the time of the handle feeding reaches the limit of the set and stored movement quantity, target position or movement range are, invalidated so that the movement quantity or position of the control axis at the time of the handle feeding is prevented from exceeding the set and stored movement quantity, target position or movement range. Furthermore, the number of pulses per interpolation period of a pulse signal output from the manual pulse generator is n-divided per interpolation period (wherein n represents an integer of 2 or larger), the division number of pulses is distributed and output to the interpolation period at the time of inputting of the pulse signal and its following (n−1) interpolation periods, and then, the handle feeding is endowed with speed increasing/decreasing characteristics.

8 Claims, 15 Drawing Sheets

FIG.3

MOVEMENT QUANTITY :

100.00

RESIDUAL DISTANCE :

28.723

CLAMPING

SET MOVEMENT QUANTITY

TARGET POSITION :

157.300

RESIDUAL DISTANCE :

15.722

\*\*CLAMPING\*\*

| | | | | | | SET MOVEMENT QUANTITY | |

33

| t | 1 | 2 | 3 | 4 | 5 | 6 | 7 | 8 | 9 | 10 | 11 | 12 | 13 | TOTAL OUTPUT |
|---|---|---|---|---|---|---|---|---|---|---|---|---|---|---|
| INPUT PULSE SPEED | 0 | 98 | 105 | 101 | 97 | 107 | 110 | 99 | 0 | 0 | 0 | 0 | 0 | 717 |
|  |  |  | 20 | 20 | 20 | 19 | 19 |  |  |  |  |  |  | 98 |
|  |  |  |  | 21 | 21 | 21 | 21 | 21 |  |  |  |  |  | 105 |
|  |  |  |  |  | 21 | 20 | 20 | 20 | 20 |  |  |  |  | 101 |
|  |  |  |  |  |  | 20 | 20 | 19 | 19 | 19 |  |  |  | 97 |
|  |  |  |  |  |  |  | 22 | 22 | 21 | 21 | 21 |  |  | 107 |
|  |  |  |  |  |  |  |  | 22 | 22 | 22 | 22 | 22 |  | 110 |
|  |  |  |  |  |  |  |  |  | 20 | 20 | 20 | 20 | 19 | 99 |
| OUTPUT PULSE SPEED | 0 | 20 | 41 | 62 | 80 | 102 | 104 | 102 | 82 | 63 | 42 | 19 | 0 | 717 |

SPEED INCREASING/DECREASING CONTROL

| t | 1 | 2 | 3 | 4 | 5 | 6 | 7 | 8 | 9 | 10 | 11 | 12 | 13 | TOTAL OUTPUT |
|---|---|---|---|---|---|---|---|---|---|----|----|----|----|---|
| PULSE SPEED | 0 | 57 | 121 | 103 | 105 | 61 | 107 | 99 | 103 | 0 | 0 | 0 | 0 | 756 |
|  |  | 12 | 12 | 11 | 11 | 11 |  |  |  |  |  |  |  | 57 |
|  |  |  | 25 | 24 | 24 | 24 | 24 |  |  |  |  |  |  | 121 |
|  |  |  |  | 21 | 21 | 21 | 20 | 20 |  |  |  |  |  | 103 |
|  |  |  |  |  | 21 | 21 | 21 | 21 | 21 |  |  |  |  | 105 |
|  |  |  |  |  |  | 13 | 12 | 12 | 12 | 12 |  |  |  | 61 |
|  |  |  |  |  |  |  | 22 | 22 | 21 | 21 | 21 |  |  | 107 |
|  |  |  |  |  |  |  |  | 20 | 20 | 20 | 20 | 19 |  | 99 |
|  |  |  |  |  |  |  |  |  | 21 | 21 | 21 | 20 | 20 | 103 |
| OUTPUT PULSE SPEED | 0 | 12 | 37 | 56 | 77 | 90 | 99 | 95 | 95 | 74 | 62 | 39 | 20 | 756 |

| t | 1 | 2 | 3 | 4 | 5 | 6 | 7 | 8 | 9 | 10 | 11 | 12 | 13 | TOTAL OUTPUT |
|---|---|---|---|---|---|---|---|---|---|----|----|----|----|---|
| PULSE SPEED | 0 | 57 | 121 | 103 | 105 | 61 | 107 | 99 | 103 | 0 | 0 | 0 | 0 | 756 |
| | | 19 | 19 | 19 | | | | | | | | | | 57 |
| | | | 41 | 40 | 40 | | | | | | | | | 121 |
| | | | | 35 | 34 | 34 | | | | | | | | 103 |
| | | | | | 35 | 35 | 35 | | | | | | | 105 |
| | | | | | | 21 | 20 | 20 | | | | | | 61 |
| | | | | | | | 36 | 36 | 35 | | | | | 107 |
| | | | | | | | | 33 | 33 | 33 | | | | 99 |
| | | | | | | | | | 35 | 34 | 34 | | | 103 |
| OUTPUT PULSE SPEED | 0 | 19 | 60 | 94 | 109 | 90 | 91 | 89 | 103 | 67 | 34 | 0 | 0 | 756 |

HANDLE FEEDING CONTROL METHOD IN A NUMERICAL CONTROL APPARATUS, AND A NUMERICAL CONTROL APPARATUS

This application is a continuation of International Application PCT/JP98/05622, with an international filing date of Dec. 11, 1998, which designated the United States, the entire contents of which are hereby incorporated by references.

TECHNICAL FIELD

The present invention relates to a handle feeding control method in a numerical control apparatus having a manual pulse generator (MGP), and a numerical control apparatus. More particularly, this invention relates to a handle feeding control method in a numerical control apparatus in which handle feeding can be performed by controlling a control axis in response to an output pulse signal from a manual pulse generator for generating a pulse signal according to a turning quantity of a manual handle, and a numerical control apparatus.

BACKGROUND ART

A numerical control apparatus generally includes, in a console panel, a manual pulse generator for allowing a control axis, which moves a cutting tool or the like, to be manually moved. The manual pulse generator generates a pulse signal according to how much a handle provided with the pulse generator is turned. The numerical control apparatus can control the control axis in response to the pulse signal output from the manual pulse generator, so as to feed the handle.

The handle is fed by a predetermined quantity (for example, 0.001 mm) per pulse output from the manual pulse generator.

The numerical control apparatus includes a magnification selection switch (a manual handle feeding quantity setting switch) concerned in the handle feeding. The magnification selection switch can vary a magnification of a movement quantity per pulse to ×10,×20, . . . or ×100.

The operator sets the magnification using the magnification selection switch. The operator then turns the manual handle of the manual pulse generator so as to finely adjust the feeding quantity of the cutting tool or the like, and thus, positions the cutting tool or the like at target coordinates.

The numerical control apparatuses provided with such a type of manual pulse generator are disclosed in Japanese Patent Application Laid-Open Nos. 9-16263, 8-339228 and 6-226586.

However, in the conventional numerical control apparatuses, it is necessary to carefully manipulate the handle of the manual pulse generator while visually confirming a value of a current position counter disposed on the console panel or the actual position of the cutting tool or the like in the case where the cutting tool or the like is accurately moved to a predetermined position by turning the manual handle of the manual pulse generator. This imposes many inconveniences on the operator.

Furthermore, if the magnification is increased in order to speedily move the cutting tool or the like so that the manual handle of the manual pulse generator is turned faster, a multiple pulse speed is remarkably increased by the effects of both the high magnification and the large number of pulses per unit period (an interpolation period, hereinafter abbreviated to "an ITP") (which may be referred to as "a pulse speed"), thereby inducing a markedly high servo motor speed. Sometimes the motor speed exceeds a fast-forward speed as the limit of a feeding speed. Consequently, the multiple pulse speed (obtained by multiplying the pulse speed by the set magnification) is clamped by the fast-forward pulse speed (obtained by dividing the number of pulses by the interpolation period) corresponding to the fast-forward speed so as not to output a command of a feeding speed faster than the fast-forward speed to an axis control circuit.

The fast-forward pulse speed is obtained by converting the fast-forward speed into the pulse speed per interpolation period. Although the feeding speed is clamped by the fast-forward pulse speed in the case where the multiple pulse speed is set in excess of the fast-forward pulse speed, an actual turning quantity of the manual handle of the manual pulse generator is different from an actual movement quantity of the control axis by the number of pulses equivalent to a discarded quantity of speed, with an attendant problem that it is difficult to grasp the precise position of the cutting tool or the like.

Moreover, in the case where the manual handle of the manual pulse generator is abruptly turned fast or is abruptly stopped while it was being turned fast, the control axis is strongly influenced by such an abruptly increased or decreased speed, so that a terrible shock is exerted on the machine tool. Therefore, the operator must pay sufficient attention when manipulating the handle of the manual pulse generator so as to prevent any shock from being exerted on the machine tool, which is disadvantageous.

The present invention has been accomplished in an attempt to solve the above-described problems experienced by the conventional art. It is an object of the present invention to provide the handle feeding control method in the numerical control apparatus which is improved such that positioning by the use of the manual pulse generator, that is, positioning by the handle feeding can be easily and simply performed without any inconvenient operation, a speed increasing or decreasing process concerned in feeding speed control by the handle feeding is precisely performed, a terrible shock can be prevented from being exerted on the machine tool even if the manual handle of the manual pulse generator is abruptly turned at a high speed or is abruptly stopped in the fast turning state, and the numerical control apparatus which is used in carrying out the handle feeding control method.

DISCLOSURE OF THE INVENTION

According to the present invention, in a handle feeding control method in a numerical control apparatus in which a control axis can be controlled in response to a pulse signal output from a manual pulse generator for generating the pulse signal according to the turning quantity of a manual handle so as to perform handle feeding, the handle feeding control method in the numerical control apparatus comprises the steps of: setting and storing at least one of a movement quantity, a target position and a movement range of the control axis; and monitoring the movement quantity or posit ion of the control axis at the time of the handle feeding, and invalidating pulse signals from the manual pulse generator thereafter when the movement quantity or position of the control axis at the time of the handle feeding reaches the limit of the set and stored movement quantity, target position or movement range so as to prevent the movement quantity or position of the control axis at the time of the handle feeding from exceeding the set and stored movement quantity, target position or movement range.

According to the above invention, the pulse signals from the manual pulse generator thereafter are invalidated when the movement quantity or position of the control axis at the time of the handle feeding reaches the limit of the set and stored movement quantity, target position or movement range, so that the movement quantity or position of the control axis at the time of the handle feeding c an be prevented from exceeding the set and stored movement quantity, target position or movement range.

Furthermore, according to the pre sent invention, there is provided a handle feeding control method in a numerical control apparatus in which in the case where handle feeding is performed in the state in which the movement quantity or position of a control axis at the time of the handle feeding reaches the limit of a set and stored movement quantity, target position and movement range, a message indicative of clamping is displayed on a display device.

According to the above invention, in the case where the handle feeding is performed in the state in which the movement quantity or position of the control axis at the time of the handle feeding reaches the limit of the set and stored movement quantity, target position and movement range, the message indicative of the clamping is displayed on the display device, so as to inform an operator of the clamping.

Moreover, according to the present invention, there is provided a handle feeding control method in a numerical control apparatus in which if a pulse speed, which is the number of pulses per unit period of a pulse signal output from a manual pulse generator, exceeds a prescribed fast-forward pulse, an effective pulse speed of axis control is clamped to the fast-forward pulse, the total of short movement quantities caused by the speed clamping is stored, and a control axis can be moved later by the stored total of the short movement quantities.

According to the above invention, if the speed is clamped to cause the short movement quantities, the total of the short movement quantities is stored, and then, the control axis can be moved later by the stored total of the short movement quantities.

Furthermore, according to the present invention, in a numerical control apparatus in which a control axis can be controlled in response to a pulse signal output from a manual pulse generator for generating the pulse signal according to the turning quantity of a manual handle so as to perform handle feeding, the numerical control apparatus comprises: a storage unit for setting and storing at least one of a movement quantity, a target position and a movement range of the control axis; and a movement quantity calculator for monitoring the movement quantity or position of the control axis at the time of the handle feeding, and invalidating pulse signals from the manual pulse generator thereafter when the movement quantity or position of the control axis reaches the limit of the set and stored movement quantity, target position or movement range so as to prevent the movement quantity or position of the control axis at the time of the handle feeding from exceeding the set and stored movement quantity, target position or movement range.

According to the above invention, the pulse signals from the manual pulse generator thereafter are invalidated when the movement quantity or position of the control axis at the time of the handle feeding reaches the limit of the movement quantity, target position or movement range set and stored in the storage unit, so that the movement quantity or position of the control axis at the time of the handle feeding can be prevented from exceeding the set and stored movement quantity, target position or movement range.

Furthermore, according to the present invention, there is provided a numerical control apparatus in which in the case where handle feeding is performed in the state in which the movement quantity or position of a control axis at the time of the handle feeding reaches the limit of the movement quantity, target position or movement range set and stored in the storage unit, a message indicative of clamping is displayed on a display device.

According to the above invention, in the case where the handle feeding is performed in the state in which the movement quantity or position of the control axis at the time of the handle feeding reaches the limit of the set and stored movement quantity, target position and movement range, the message indicative of the clamping is displayed on the display device, so as to inform an operator of the clamping.

Moreover, according to the present invention, there is provided a numerical control apparatus in which if a pulse speed, which is the number of pulses per unit period of a pulse signal output from a manual pulse generator, exceeds a prescribed fast-forward pulse, the movement quantity calculator clamps an effective pulse speed of axis control to the fast-forward pulse, the total of the short movement quantities caused by the speed clamping is stored in the storage unit, and a control axis can be moved later by the total of the short movement quantities stored in the storage unit.

According to the above invention, if the speed is clamped to cause the short movement quantities, the total of the short movement quantities is stored in the storage unit, and then, the control axis can be moved later by the total of the short movement quantities stored in the storage unit.

Furthermore, according to the present invention, in a handle feeding control method in a numerical control apparatus in which a control axis can be controlled in response to a pulse signal output from a manual pulse generator for generating the pulse signal according to the turning quantity of a manual handle so as to perform handle feeding, the handle feeding control method in the numerical control apparatus comprises the steps of: n-dividing the number of pulses per interpolation period of a pulse signal output from the manual pulse generator per interpolation period (wherein n represents an integer of 2 or larger), distributing and outputting the division number of pulses to the interpolation period at the time of inputting of the pulse signal and its following (n−1) interpolation periods, and then, endowing the handle feeding with speed increasing/decreasing characteristics.

According to the above invention, the number of pulses per interpolation period of the pulse signal output from the manual pulse generator is n-divided per interpolation period, the division number of pulses is distributed and output to the interpolation period at the time of inputting of the pulse signal and its following (n−1) interpolation periods, and then, the handle feeding is endowed with the speed increasing/decreasing characteristics.

Furthermore, according to the present invention, there is provided a handle feeding control method in a numerical control apparatus in which a fraction m (wherein m is an integer smaller than n) produced by the n-division of the number of pulses per interpolation period is output in such a manner as to be respectively distributed to the m interpolation periods out of the n interpolation periods.

According to the above invention, even if the fraction m is produced by the n-division of the number of pulses per interpolation period, the handle feeding can be endowed with the speed increasing/decreasing characteristics.

Moreover, according to the present invention, there is provided a handle feeding control method in a numerical control apparatus in which the division number n of pulses can be arbitrarily varied and set by an operator.

According to the above invention, the division number n of pulses can be arbitrarily varied and set by the operator in conformity with a machine tool.

Furthermore, according to the present invention, there is provided a handle feeding control method in a numerical control apparatus in which the division number n of pulses is an integer obtained by dividing the clamp pulse speed by an allowable maximum increased/decreased speed.

According to the above invention, the division number n of pulses can be set, as a default value, to the integer obtained by dividing the clamp pulse speed by the allowable maximum increased/decreased speed.

BRIEF DESCRIPTION OF THE DRAWINGS

FIG. 3 is a diagram showing a movement quantity setting screen in the numerical control apparatus according to the present invention;

FIG. 5 is a diagram showing a target position setting screen in the numerical control apparatus according to the present invention.

BEST MODE FOR CARRYING OUT THE INVENTION

The present invention will be described in details below in reference to the attached drawings.

Figure 1:
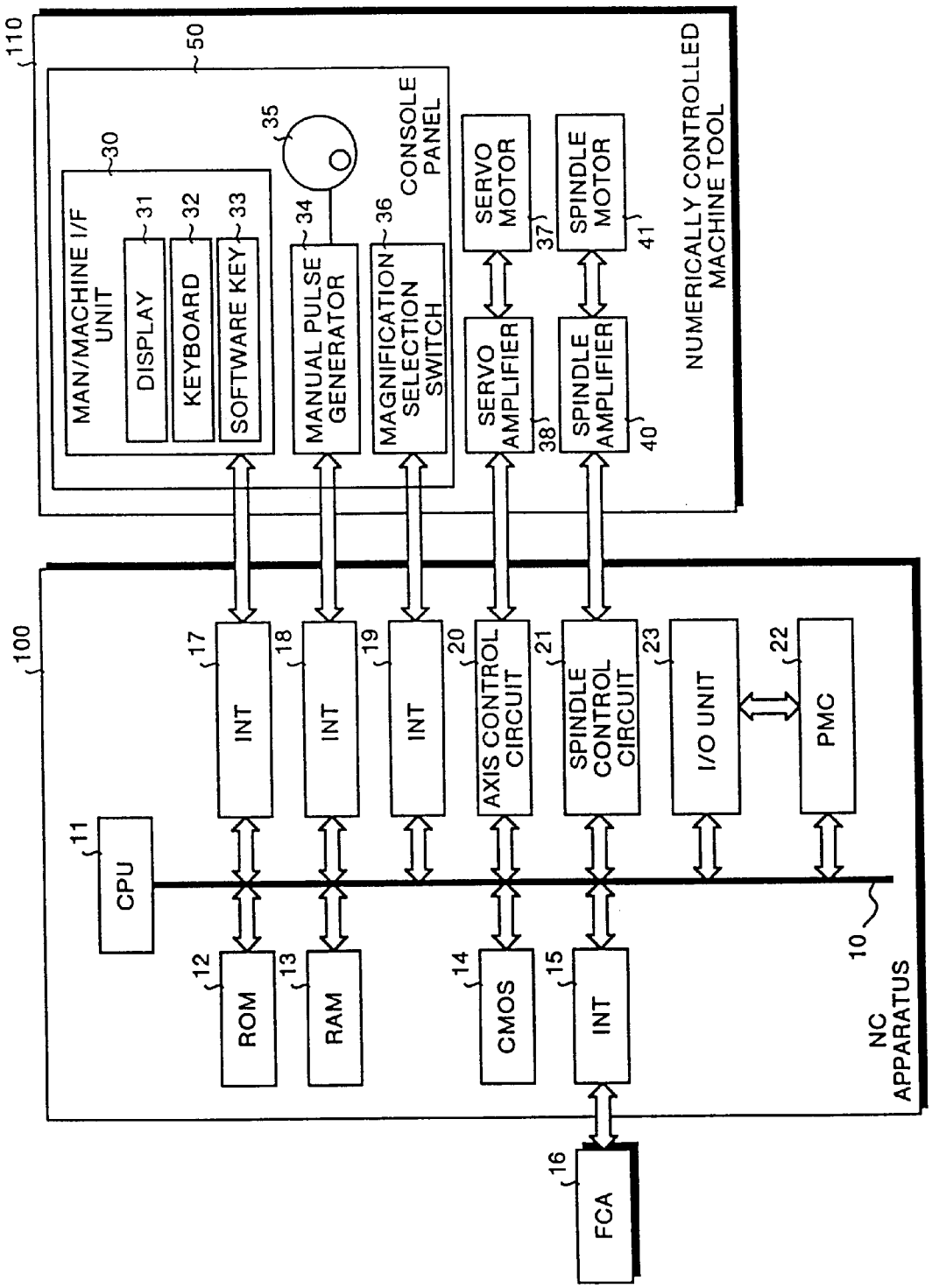
FIG. 1 is a block diagram showing a numerical control apparatus in one preferred embodiment according to the present invention.

FIG. 1 shows a numerical control apparatus (NC apparatus) according to the present invention. The numerical control apparatus 100 is of a computer type, which comprises bus 10, processor (CPU) 11, ROM 12, RAM 13, CMOS memory 14, interface 15 for connecting external equipment, interfaces 17, 18 and 19 for connecting a numerically controlled machine tool, axis control circuit 20, a spindle control circuit 21, a PMC (programmable machine controller) 22 and an I/O unit 23.

The ROM 12 previously stores therein various system programs for implementing the edition mode processing, which is required for creating and editing processing programs, or the processing for automatic operations. The CPU 11 reads the system program stored in the ROM 12 through the bus 10 so as to control the numerical control apparatus 100 as a whole in accordance with the system program.

The RAM 13 is a memory which temporarily stores therein calculation data, display data or the like. The CMOS memory 14 is backed up by a battery, not shown, and is configured as a nonvolatile memory in which the stored state can be held even if a power source of a numerical control apparatus 100 is turned off. The CMOS memory 14 stores therein a processing program, a tool offset quantity and a parameter which are read through the interface 15, a processing program, a tool offset quantity and a parameter which are input via a man/machine I/F unit 30, and the like.

The interface 15 is adapted to connect external equipment to the numerical control apparatus 100. The external equipment 16 is, for example, a floppy cassette adapter (FCA). The processing program, the tool offset quantity, the parameter and the like are read out from the external equipment 16. Further, the processing program, the tool offset quantity, the parameter and the like edited inside the numerical control apparatus 100 can be stored in a floppy cassette or the like using the external equipment 16.

The PMC 22 is a sequence controller built in the numerical control apparatus 100, and is adapted to control auxiliary devices for a numerically controlled machine tool 110, for example, a coolant, a spindle and actuators such as an automatic tool changer (ATC). The PMC 22 converts M function, S function or T function instructed in accordance with the processing program into a signal required on the side of the auxiliary device so as to output the signal from the I/O unit 23 to the side of the auxiliary device in the numerically controlled machine tool 110. The auxiliary devices such as various actuators are actuated in response to this output signal. Moreover, the PMC 22 receives, through the I/O unit 23, signals transmitted from various switches disposed on a console panel provided in the numerically controlled machine tool 110, subjects the signals to necessary processing, and then, transfers the signals to the processor 11.

The current position of each axis of the numerically controlled machine tool 110, an alarm, parameters, image data and the like are transmitted to the man/machine I/F unit 30, to be displayed on a display 31.

The man/machine I/F unit 30 is disposed in a console panel 50 in the numerically controlled machine tool 110. This man/machine I/F unit 30 is a data input device having the display 31 such as a CRT or a liquid crystal display, a keyboard 32, a software key 33 and the like. The interface 17 receives data from the keyboard 32 and the software key 33 provided in the man/machine I/F unit 30, and then, transfers it to the processor 11.

The keyboard 32 has keys to be used when inputting data input, function keys and the like. The software key 33 can instruct different commands in accordance with screens selected by the operator. The commands to be selected are displayed on the screen.

The interface 18 is connected to a manual pulse generator 34 in the numerically controlled machine tool 110, and receives a pulse signal from the manual pulse generator 34. The manual pulse generator 34 is mounted on the console panel 50 in the numerically controlled machine tool 110, and is used for precisely positioning each of the axes of the numerically controlled machine tool 110. The manual pulse generator 34 generates a pulse signal in accordance with a turning quantity of a manual handle 35, so that each of the axes is moved in response to the pulse signal.

The console panel 50 in the numerically controlled machine tool 110 is provided with a magnification selection switch (a manual handle feeding quantity setting switch) 36. The magnification selection switch 36 selectively sets a handle feeding magnification of the manual pulse generator 34, and is connected to the interface 19. The interface 19 transfers a magnification setting signal from the magnification selection switch 36 to the processor 11.

A servo motor 37 for every control axis, provided in the numerically controlled machine tool 110, incorporates therein a position/speed detector, not shown. A position/speed feedback signal from the position/speed detector incorporated in the servo motor is fed back to the axis control circuit 20 via a servo amplifier 38.

The axis control circuit 20 controls a position and a speed based on a moving command of each of the control axes from the processor 11 and the feedback signal, and then, outputs a drive signal to the servo amplifier 38 for each of the axes in the numerically controlled machine tool 110. Upon receipt of this command, the servo amplifier 38 drives the servo motor 37 for each of the axes in the numerically controlled machine tool 110.

Although not shown, a position decoder is provided in a spindle motor 41 provided in the numerically controlled machine tool 110. This position decoder outputs a feedback pulse in synchronism with rotation of a not shown spindle. The feedback pulse is fed back to the spindle control circuit 21. The spindle control circuit 21 controls the speed based on a spindle rotating speed command transmitted from the processor 11 and the feedback pulse, and then, outputs a spindle speed signal to a spindle amplifier 40. Upon receipt of the spindle speed signal, the spindle amplifier 40 allows the spindle motor 41 to be rotated at the instructed rotating speed, so as to rotate and drive a tool or a workpiece, not shown, mounted in the spindle.

Figure 2:
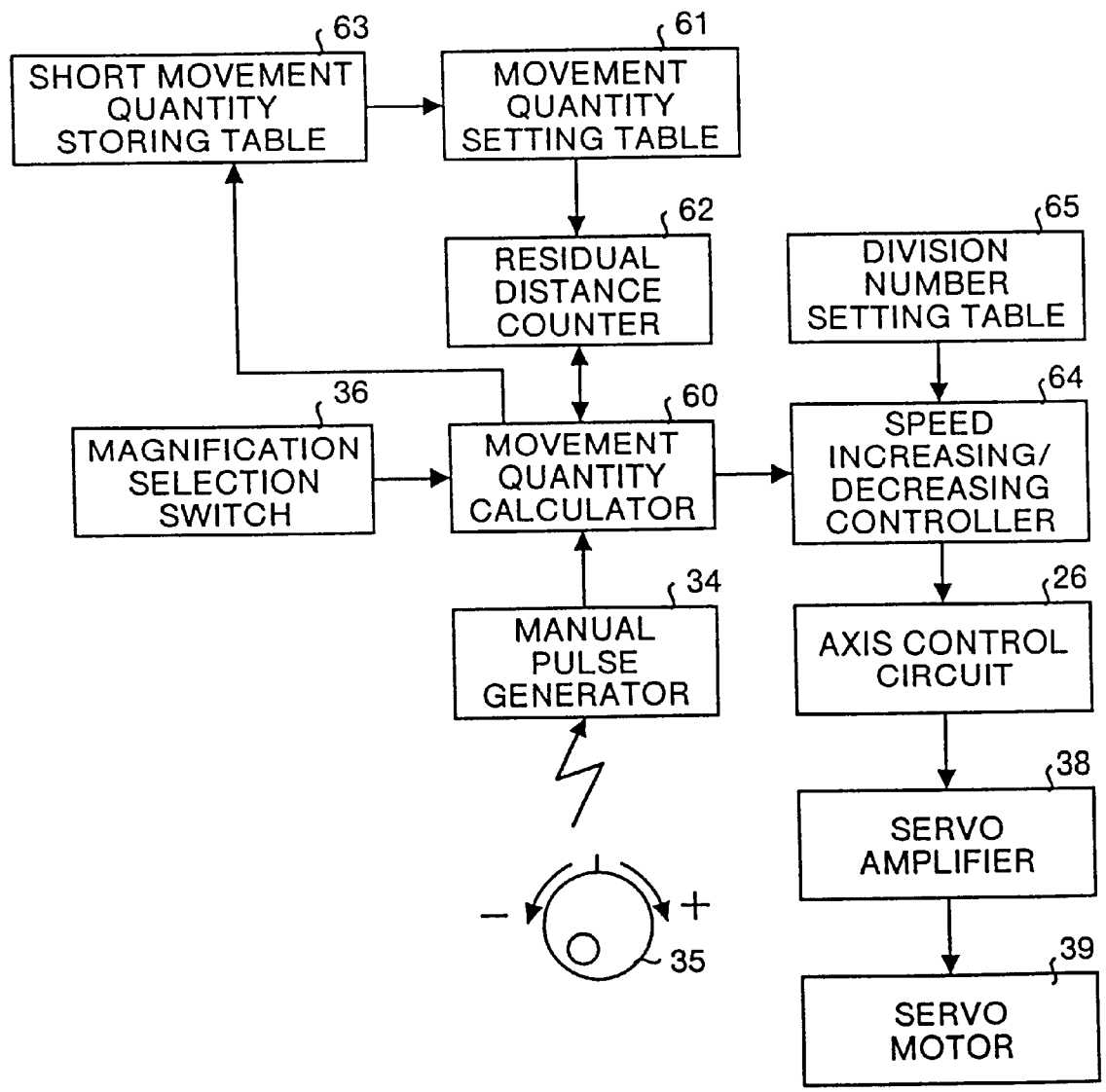
FIG. 2 is a block diagram showing main parts (in a handle feeding system) in the numerical control apparatus for carrying out a handle feeding control method in the preferred embodiment according to the present invention.

FIG. 2 shows main parts (a handle feeding system) of the numerical control apparatus which implements a handle feeding control method according to the present invention. The handle feeding system comprises manual pulse generator 34, magnification selection switch 36, movement quantity (amount of movement) calculator 60, a movement quantity setting table 61, residual distance (distance remained to be moved) counter 62, short movement quantity storing table 63, speed increasing/decreasing controller 64, division number setting table 65, axis control circuit 26, servo amplifier 38 and servo motor 39.

The processor 11 executes the system program so as to embody the movement quantity calculator 60 and the speed increasing/decreasing controller 64.

The movement quantity setting table 61, the short movement quantity storing table 63 and the residual distance counter 62 are assigned to the RAM 13, and further, the division number setting table 65 is assigned to the CMOS 14.

The movement quantity calculator 60 calculates a multiple pulse speed based on a magnification set using the magnification selection switch 36 and the number of pulses generated per unit period by the manual pulse generator 34, i.e., the number of pulses per interpolation period (ITP). Assuming that the magnification selection switch 36 sets ×100 to generate 100 pulses per unit period (per interpolation period, i.e., ITP) by turning the manual handle 35 of the manual pulse generator 34, the movement quantity calculator 60 calculates the multiple pulse speed to be a pulse speed of 10,000 (100×100), i.e., 10,000 pulses/ITP.

Subsequently, the movement quantity calculator 60 calculates a fast-forward pulse speed. The fast-forward pulse speed is obtained by converting a fast-forward speed into a pulse speed per interpolation period. Consequently, assuming that, for example, the fast-forward speed as a prescribed value for each machine tool is 10,000 mm/min, interpolation period (ITP) is 8 msec and interpolation unit is 0.001 mm, the fast-forward pulse speed will be $(10,000 \times 8 \times 10^{-3})/(60 \times 0.001)=1,333$ pulses/ITP. This is referred to as a clamp pulse speed.

The movement quantity calculator 60 compares the clamp pulse speed with the multiple pulse speed per interpolation period. If the multiple pulse speed is equal to or lower than the clamp pulse speed, the multiple pulse speed is output to the speed increasing/decreasing controller 64. In contrast, if the multiple pulse speed exceeds the clamp pulse speed, the clamp pulse speed is output to the speed increasing/decreasing controller 64.

The speed increasing/decreasing controller 64 endows the pulse speed (the multiple pulse speed or the clamp pulse speed) calculated by the movement quantity calculator 60 with appropriate speed increasing/decreasing characteristics, to produce an axis moving command, and then, outputs the command to the axis control circuit 26.

The movement quantity setting table 61 stores therein a movement quantity input using the keyboard. The movement quantity setting operation is performed by inputting a relative movement quantity by which the machine tool is to be moved by feeding the handle (a distance by which the machine tool can be moved from the current position) in a region indicating the contents of the movement quantity setting table 61 on a movement quantity setting screen of the display 31 shown in FIG. 3 from the keyboard 32. When the movement quantity is set in the movement quantity setting region it is stored in the movement quantity setting table 61.

When the software key 33 displayed on the movement quantity setting screen, i.e., when the set movement quantity key is depressed, a value equal to the movement quantity stored in the movement quantity setting table 61 is initialized in the residual distance counter 62. Thereafter, the value of the residual distance counter 62 is displayed in a residual distance counter region on the display screen.

The residual distance counter 62 subtracts a movement quantity in accordance with the axis moving command to be output to the axis control circuit 20 from the current value per interpolation period, and then, counts a residual distance.

When the value of the residual distance counter 62 becomes zero, the movement quantity calculator 60 invalidates the pulse signal from the manual pulse generator 34, that is, forces it to become zero.

Consequently, if the value of the residual distance counter 62 becomes zero, or in other words, if the control axis is moved by the movement quantity set by the movement quantity setting table 61, the axis is not moved even if the handle of the manual pulse generator 34 is manipulated. The axis movement is clamped, so that the control axis can be prohibited from being moved in excess of the set movement quantity.

In this way, in the case where the axis movement is clamped, a message indicative of clamping is displayed on the display 31, as shown in FIG. 3, in order to inform the operator of the clamping.

If the control axis is to be moved again by the movement quantity stored in the movement quantity setting table 61, the control axis may be moved only by depressing the software key 33, i.e., set movement quantity key. Otherwise, if another movement quantity is to be set, the control axis may be moved only by setting such a movement quantity in the movement quantity setting region, and then, depressing the software key 33, i.e., set movement quantity key.

Figure 4:
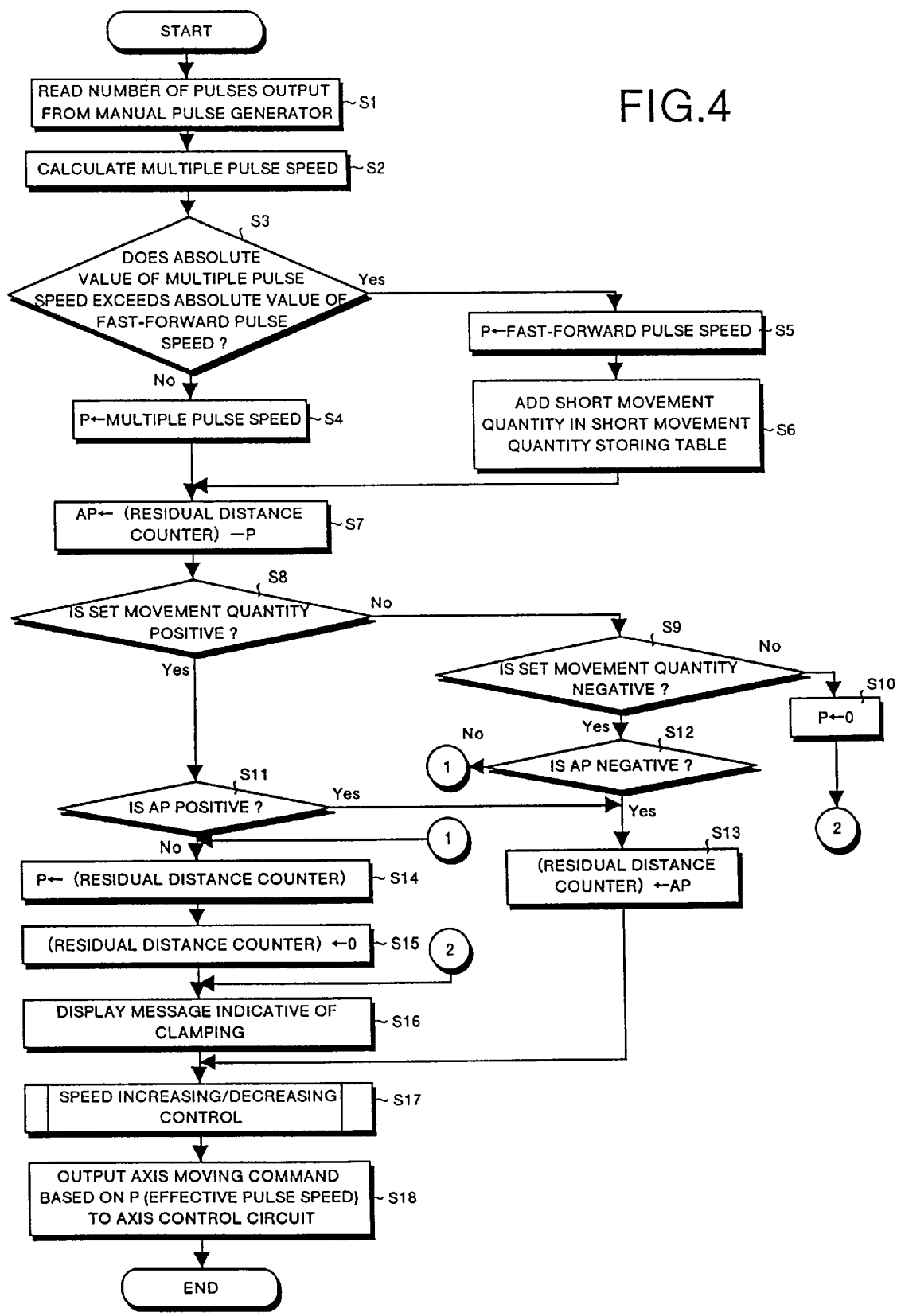
FIG. 4 is a flowchart showing procedures of movement quantity calculation in setting a movement quantity in the numerical control apparatus according to the present invention.

Next, referring to FIG. 4, explanation will be given of the processes performed by the movement quantity calculator 60. The processing routine of the movement quantity calculator 60 shown in FIG. 4 is repeatedly executed for every interpolation period.

First, the number of pulses output from the manual pulse generator 34 is read, and thus, the pulse speed (pulses/ITP) is acquired (step S1). A plus value is output when the handle 35 of the manual pulse generator 34 is turned in a plus direction (clockwise), and a minus value is output when the handle is turned in a minus direction (counterclockwise).

Subsequently, the multiple pulse speed is calculated by multiplying the magnification set using the magnification selection switch 36 by the pulse speed (step S2). For example, assuming that the number of pulses output from the manual pulse generator 34 is 100 and the magnification is 100, the multiple pulse speed will be 10,000 pulses/ITP.

Thereafter, it is judged whether or not an absolute value of the multiple pulse speed exceeds an absolute value of the previously calculated fast-forward pulse speed (the clamp pulse speed) (step S3). Unless the absolute value of the multiple pulse speed exceeds the absolute value of the fast-forward pulse speed (that is, if the judgment at step S3 is negative), the multiple pulse speed is set to a variable P indicating an effective pulse speed (step S4). In contrast, if the absolute value of the multiple pulse speed exceeds the absolute value of the fast-forward pulse speed (that is, if the judgment at step S3 is affirmative), the fast-forward pulse speed is set to the variable P indicating the effective pulse speed (step S5). In this case, although the multiple pulse speed is normally to be output, the movement quantity designated by actually turning the manual handle 35 of the manual pulse generator 34 becomes short since the speed has been clamped by the previously calculated clamp pulse speed.

Therefore, the absolute value of the clamp pulse speed is subtracted from the absolute value of the multiple pulse speed, and then, the pulse speed (the number of pulses) obtained by the subtraction is additionally stored in the short movement quantity storing table 63 (step S6).

Thereafter, a value obtained by subtracting the number of pulses represented by the variable P from a value of the residual distance counter 62 is set to another variable AP (step S7). The number of pulses represented by the variable P corresponds to a movement quantity per interpolation period in accordance with the axis movement command to be output to the axis control circuit 20.

Subsequently, it is judged whether or not the set movement quantity is positive (step S8). Unless the set movement quantity is positive (that is, the judgement at step S8 is negative), it is judged whether or not the set movement quantity is negative (step S9). If the set movement quantity is not negative, either (that is, the judgement at step S9 is negative), the variable P is set to "0" (step S10), and then, the processing routine jumps to step S16.

If the set movement quantity is positive (that is, the judgement at step S8 is affirmative), it is judged whether or not the variable AP is positive (step S1). If the variable AP is positive (that is, the judgement at step S11 is affirmative), the variable AP is set in the residual distance counter 62 (step S13), and then, the variable P is subjected to speed increasing/decreasing control (step S17). Thus, the axis moving command based on the variable P after the speed increasing/decreasing control is output to the axis control circuit 26 (step S18).

In contrast, if the set movement quantity is negative (that is, the judgement at step S9 is affirmative), it is judged whether or not the variable AP is negative (step S12). If the variable AP is negative (that is, the judgement at step S12 is affirmative), the variable AP is set in the residual distance counter 62, which is then updated (step S13), and then, the variable P is subjected to speed increasing/decreasing control (step S17). Thus, the axis moving command based on the variable P after the speed increasing/decreasing control is output to the axis control circuit 26 (step S18).

In contrast, if the set movement quantity is positive and the variable AP is not positive (that is, the judgement at step S11 is negative) or if the set movement quantity is negative and the variable AP is not negative (that is, the judgement at step S12 is negative), the value in the residual distance counter 62 is set to the variable P for residual distance movement (step S14). Thereafter, "0" is set to the residual distance counter 62 (step S15), and then, a message indicative of clamping is displayed on the screen (step S16).

In this way, if the axis movement quantity reaches the set movement quantity, the axis cannot be moved, that is, the axis movement is clamped since the variable P is set to "0" even if the manual pulse generator 34 is further operated, thus prohibiting the control axis from being moved in excess of the set movement quantity.

Although in the above-described embodiment, the relative movement quantity (a distance by which the machine tool can be moved from the current position) is set in the movement quantity setting table 61, a target value may be set as an absolute position (i.e. coordinates of the position) in place of the movement quantity, as shown in FIG. 5.

In this case, when a target position is set in a target value setting region, this value is set in the movement quantity setting table 61. When the software key 33, i.e., set movement quantity key is depressed, a value obtained by subtracting a value representing the current position of the control axis from a value stored in the movement quantity setting table 61 is set in the residual distance counter 62. This value set in the residual distance counter 62 may be displayed in the residual distance counter region.

Figure 6:
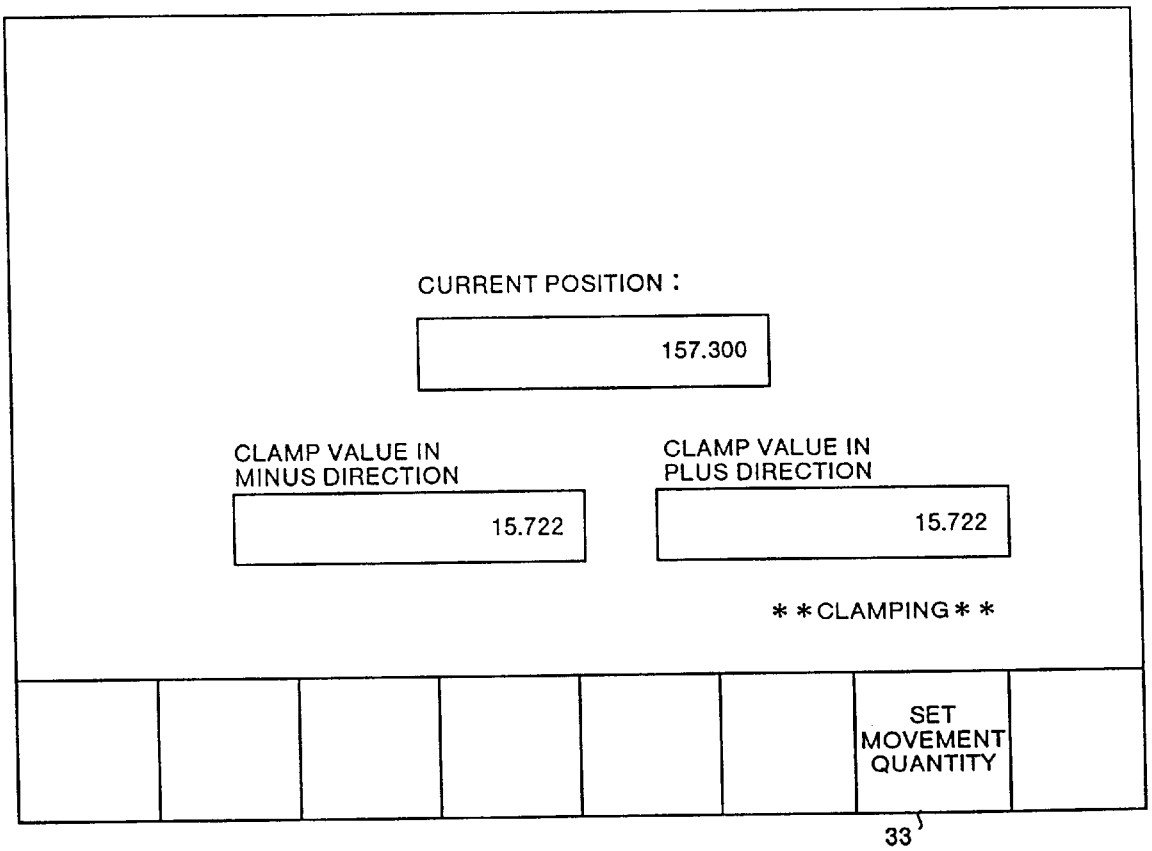
FIG. 6 is a diagram showing a movement range setting screen in the numerical control apparatus according to the present invention.

Alternatively, clamp values in both plus and minus directions may be set with respect to a certain control axis, so that a movable range by the handle feeding can be set, as shown in FIG. 6. In this case, the axis is moved by the handle feeding only within the set range, and therefore, this case is effective in the case where the axis is allowed to be moved only within a specified range at the time of the handle feeding by the manual pulse generator 34.

Figure 7:
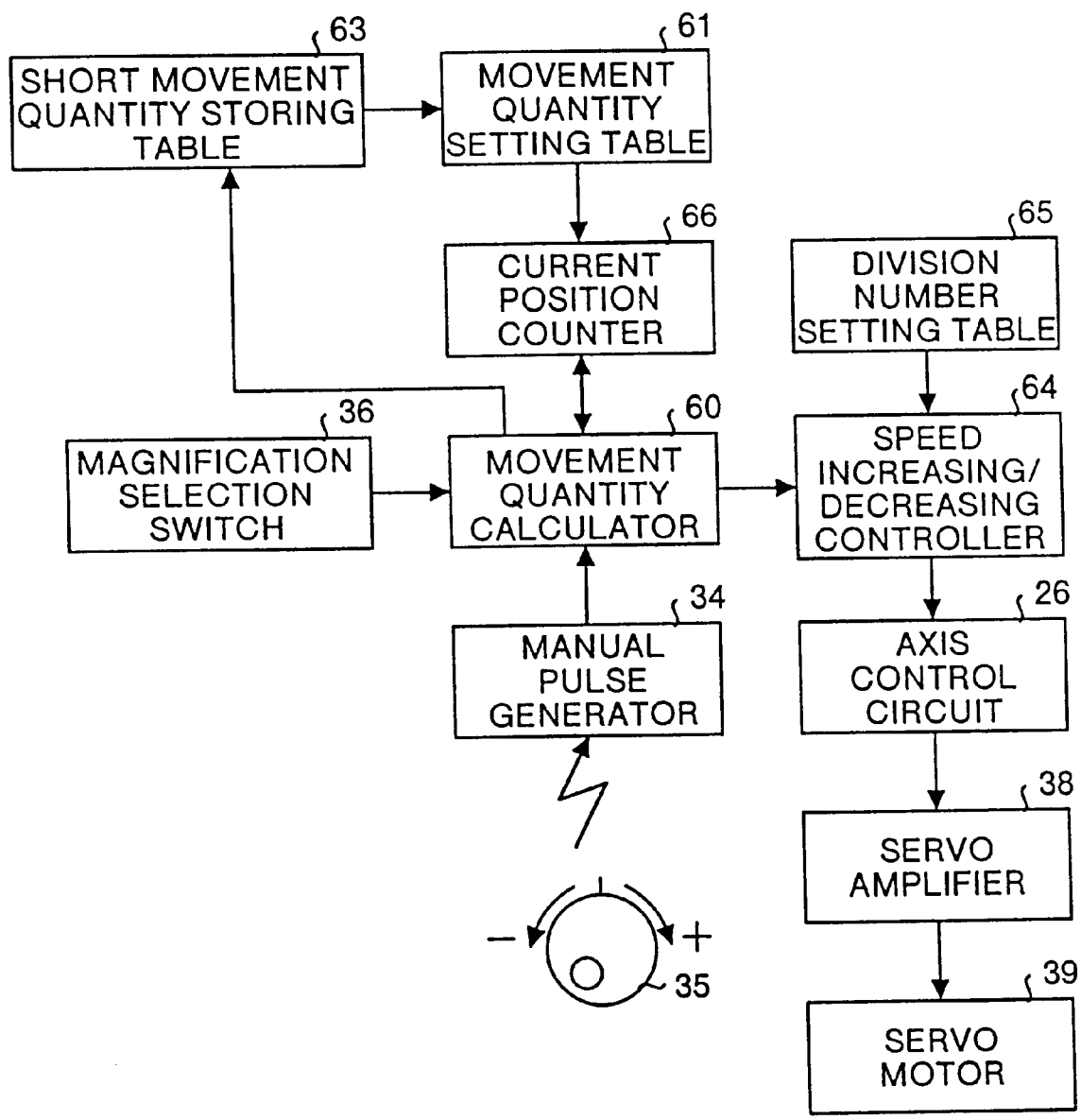
FIG. 7 is a block diagram showing main parts (in a handle feeding system) in a numerical control apparatus for carrying out a handle feeding control method in another preferred embodiment according to the present invention.

In this case, a current position counter 66 is used in place of the residual distance counter 62, as shown in FIG. 7. In FIG. 7, component that are similar to those in FIG. 2 are denoted by the same reference numerals, and the description thereof will be omitted to avoid duplication.

Figure 8:
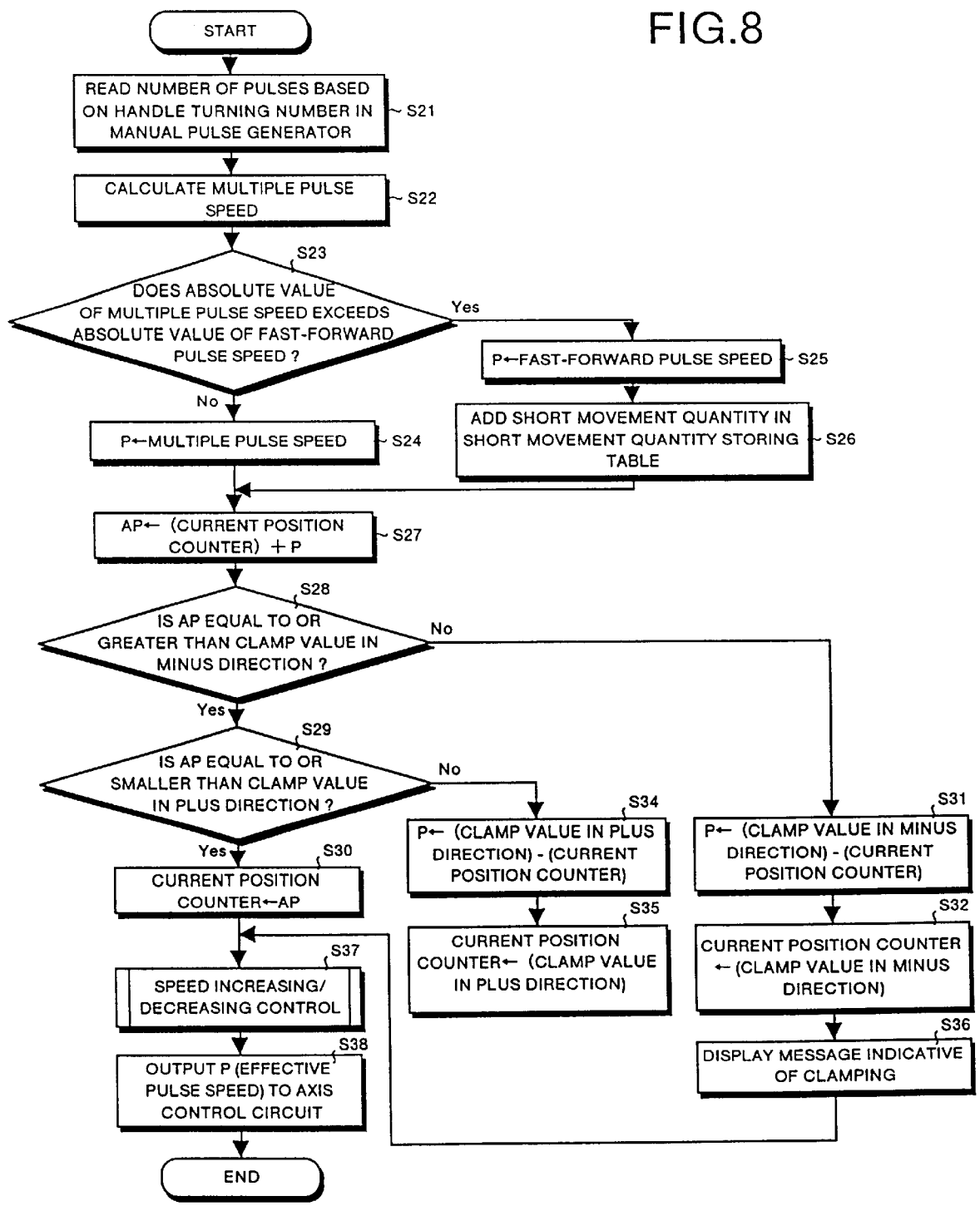
FIG. 8 is a flowchart showing procedures of movement quantity calculation in setting a movement range in the numerical control apparatus according to the present invention.

Next, referring to FIG. 8, explanation will be given about the processes performed by the movement quantity calculator 61. The processing routine of the movement quantity calculator 60 shown in FIG. 4 is repeatedly executed per interpolation period.

First, the number of pulses output from a manual pulse generator 34 is read, and thus, a pulse speed (pulses/ITP) is acquired (step S21).

Subsequently, a multiple pulse speed is calculated by multiplying magnification set using the magnification selection switch 36 by the pulse speed (step S22).

Thereafter, it is judged whether or not an absolute value of the multiple pulse speed exceeds an absolute value of a previously calculated fast-forward pulse speed (a clamp pulse speed) (step S23). If the absolute value of the multiple pulse speed does not exceed the absolute value of the fast-forward pulse speed (that is, if the judgment at step S23 is negative), the multiple pulse speed is set to a variable P indicating an effective pulse speed (step S24).

In contrast, if the absolute value of the multiple pulse speed exceeds the absolute value of the fast-forward pulse speed (that is, if the judgment at step S23 is affirmative), the fast-forward pulse speed is set to the variable P indicating the effective pulse speed (step S25). The absolute value of the clamp pulse speed is subtracted from the absolute value of the multiple pulse speed, and then, the pulse speed (the number of pulses) obtained by the subtraction is additionally stored in a short movement quantity storing table 63 (step S26).

Thereafter, a value obtained by adding the number of pulses represented by the variable P to a value of a current distance counter 66 is set to another variable AP (step S27). The number of pulses represented by the variable P corresponds to a movement quantity per interpolation period in accordance with an axis moving command to be output to the axis control circuit 20.

Subsequently, it is judged whether or not a variable AP is equal to or greater than a clamp value in a minus direction (step S28). If the variable AP is equal to or greater than the clamp value in the minus direction (the judgment at step S28 is affirmative), then it is judged whether or not the variable AP is equal to or smaller than a clamp value in a plus direction (step S29).

If the variable AP is equal to or smaller than the clamp value in the plus direction (the judgment at step S29 is affirmative), then the variable AP is set to the current position counter 66, which is thus updated (step S30). Thereafter, the variable P is subjected to speed increasing/decreasing control (step S37), and then, the axis moving command based on the variable P after the speed increasing/decreasing control is output to the axis control circuit 26 (step S38).

In contrast, if the variable AP is smaller than the clamp value in the minus direction (the judgment at step S28 is negative), a value obtained by subtracting a value stored in the current position counter 66 from the clamp value in the minus direction is set as the variable P for the purpose of residual distance movement (step S31). Thereafter, the value stored in the current position counter 66 is set as the clamp value in the minus direction (step S32), and then, a message indicative of clamping is displayed on a screen (step S36).

In contrast, if the variable AP is greater than the clamp value in the plus direction the judgment at step S29 is negative), a value obtained by subtracting a value stored in the current position counter 66 from the clamp value in the plus direction is set as the variable P for the purpose of the residual distance movement (step S34). Thereafter, the value stored in the current position counter 66 is set as the clamp value in the plus direction (step S35), and then, a message indicative of clamping is displayed on the screen (step S36).

In this way, if the axis movement quantity reaches the clamp value in the minus direction or the clamp value in the plus direction, the axis cannot be moved, that is, the axis movement is clamped since the variable P is set to zero even if the handle of the manual pulse generator 34 is manipulated, thus prohibiting the control axis from being moved in excess of the set movable range (region).

Figure 9:
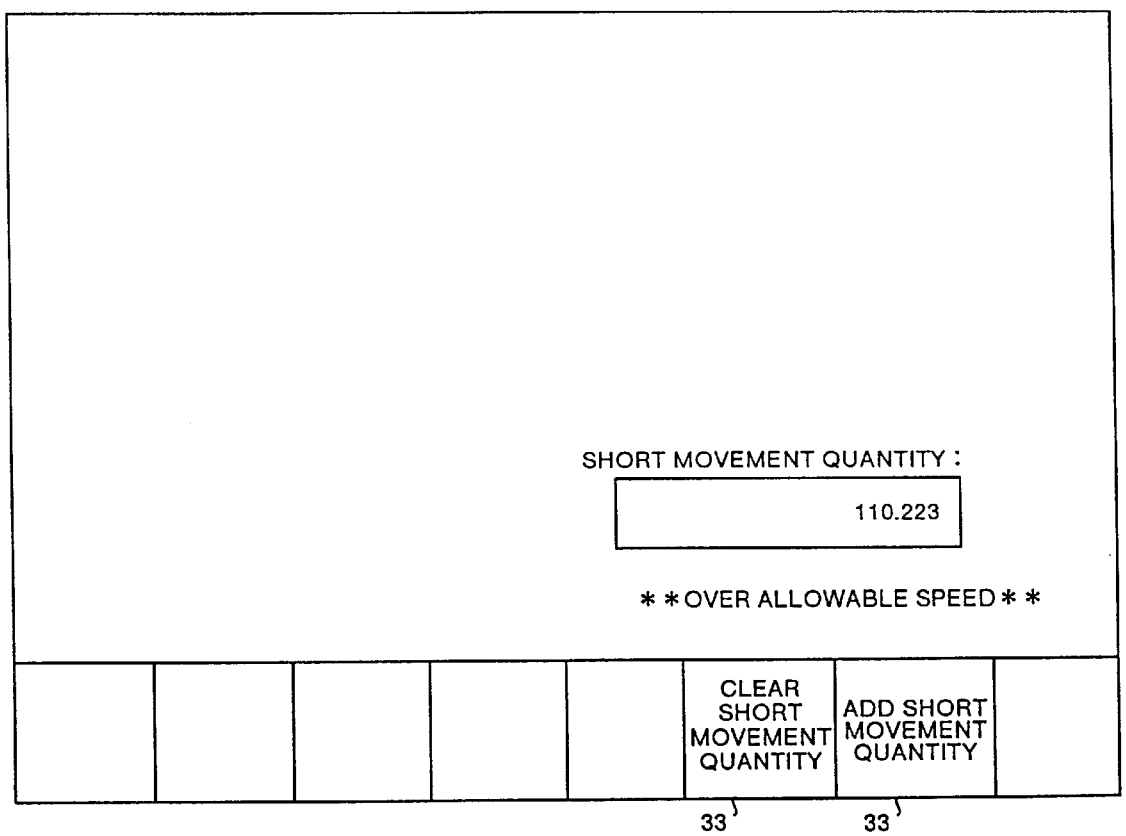
FIG. 9 is a diagram showing a short movement quantity setting screen in the numerical control apparatus according to the present invention.

In either of the above-described embodiments, in the case where the manual handle 35 of the manual pulse generator 34 is turned so rapidly that the absolute value of the multiple pulse speed becomes higher than the absolute value of the fast-forward pulse speed and the effective pulse speed is clamped by the fast-forward speed, a message can be displayed on the screen indicating that the speed is clamped by the clamp pulse speed, as shown in FIG. 9.

The total quantity of differences between the movement quantities designated by actually turning the manual handle 35 of the manual pulse generator 34 and real movement quantities, which are generated by clamping the feeding speed, is stored in the short movement quantity storing table 63 as a short movement quantity. The contents of the short movement quantity storing table 63 can be displayed on the screen as the short movement quantity, as shown in FIG. 9.

If this short movement quantity is unnecessary, the software key 33, i.e., clear short movement quantity key may be simply depressed. Depressing this key erases the record of the short movement quantity accumulated in the short movement quantity storing table 63. Otherwise, in the case where only the short movement quantity is to be moved again, the software key 33, i.e., add short movement quantity key may be merely depressed. Depressing this key allows the handle feeding by the manual pulse generator 34 by the short movement quantity stored in the short movement quantity storing table 63.

Subsequently, explanation will be given about the speed increasing/decreasing controller 64. The speed increasing/decreasing controller 64 divides the number of pulses per interpolation period of the pulse signal output from the manual pulse generator 34 into n divisions (wherein n represents an integer of 2 or larger), distributes and outputs the division number of pulses to the interpolation period at the time of inputting of the pulse signal and its following (n−1) interpolation periods, and then, endows the handle feeding with speed increasing/decreasing characteristics. If a fraction m (wherein m is an integer smaller than n) is produced by the n-division of the number of pulses per interpolation period, the fraction m is output in such a manner as to be respectively distributed to the m interpolation periods out of the n interpolation periods.

For example, assume that the division number n is equal to 5 and the number of pulses input per interpolation period is 98. Therefore, 98 is divided by 5, and then, the result is output to the axis control circuit 26. In this case, 98 divided by 5 equals 19 with a remainder of 3, resulting in 19+1, 19 +1, 19+1, 19 and 19. That is, instead of outputting the pulse speed of 98 once, the axis moving command based on the five-divided pulse speeds, i.e., 20, 20, 20, 19 and 19 is output to the axis control circuit 26.

Figure 10:
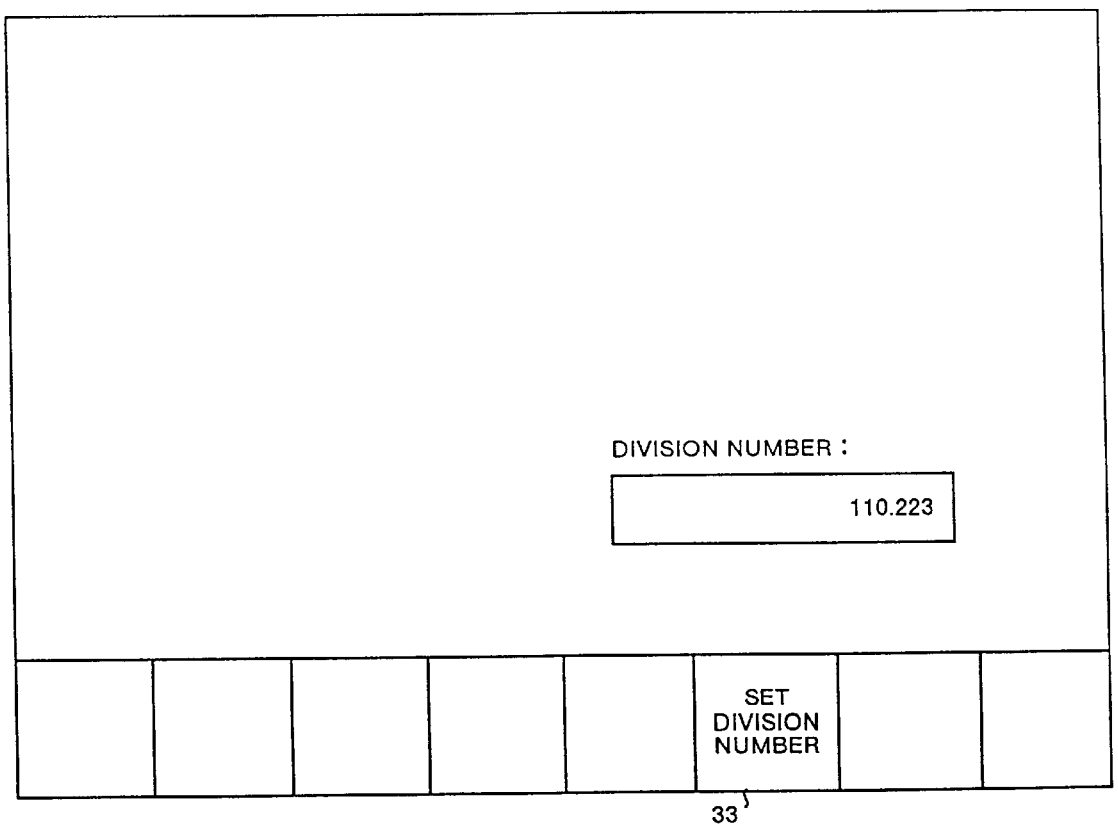
FIG. 10 is a diagram showing a division number setting screen of speed increasing or decreasing control in the numerical control apparatus according to the present invention.

FIG. 10 shows a division number setting screen on the display 31. On this screen, the division number (which is an integer of 2 or larger) designating how many the pulses per interpolation period output from the manual pulse generator 34 are divided can be set in a division number setting region indicating the contents of a division number setting table 65. When the division number is set in the division number setting region and the software key 33, i.e., set division number key is depressed, a value displayed in the division number setting region is stored in the division number setting table 65. In this way, the division number n can be arbitrarily set by the operator. The division number n can take, as a default value, an integer obtained by dividing the clamp pulse speed by an allowable maximum increased/ decreased speed.

Next, referring to FIG. 11 and FIG. 12, explanation will be given about the processes performed by the speed increasing/decreasing control by the speed increasing/ decreasing controller 64.

Figure 11:
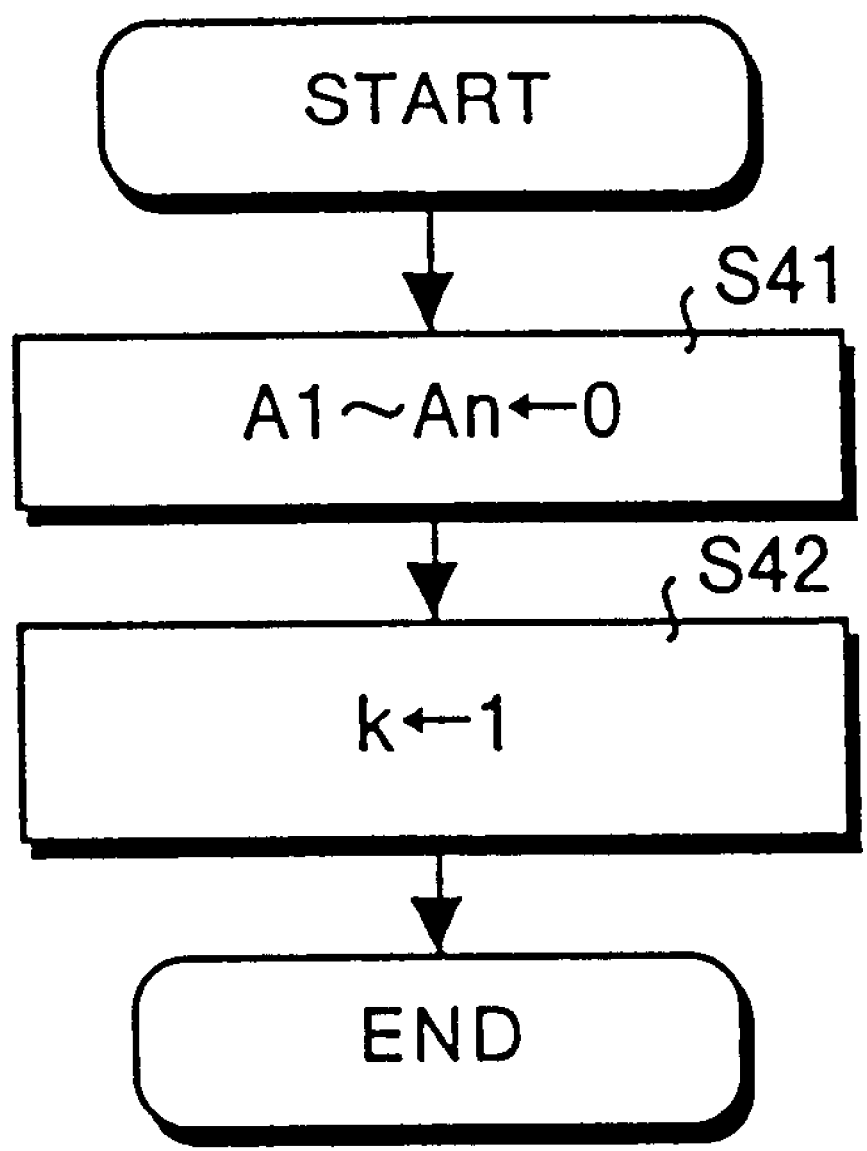
FIG. 11 is a flowchart showing initialization for the speed increasing or decreasing control in the numerical control apparatus according to the present invention.

FIG. 11 shows the initialization routine which is executed upon turning-on of a power source of the CNC. Values of ring buffers A1 to An equal to the maximum division number are cleared to zero (step S41). Thereafter, a variable k as an output pointer of each of the ring buffers A1 to An is initialized to 1 (step S42). The variable k takes an integer from 1 to n.

Here, the pulse speed input to the speed increasing/ decreasing controller 64 from the movement quantity calculator 60 is represented as an input pulse speed Pi, and the pulse speed after increasing/decreasing speed adjustment is represented as an output pulse speed Po. Moreover, n represents the division number (which is an integer) designated in the division number setting table 37; m (which is an integer), the remainder produced when the input pulse speed Pi is divided by the division number n; and a variable i, an input pointer of each of the ring buffers A1 to An, wherein the variable i takes an integer from 1 to n.

Figure 12:
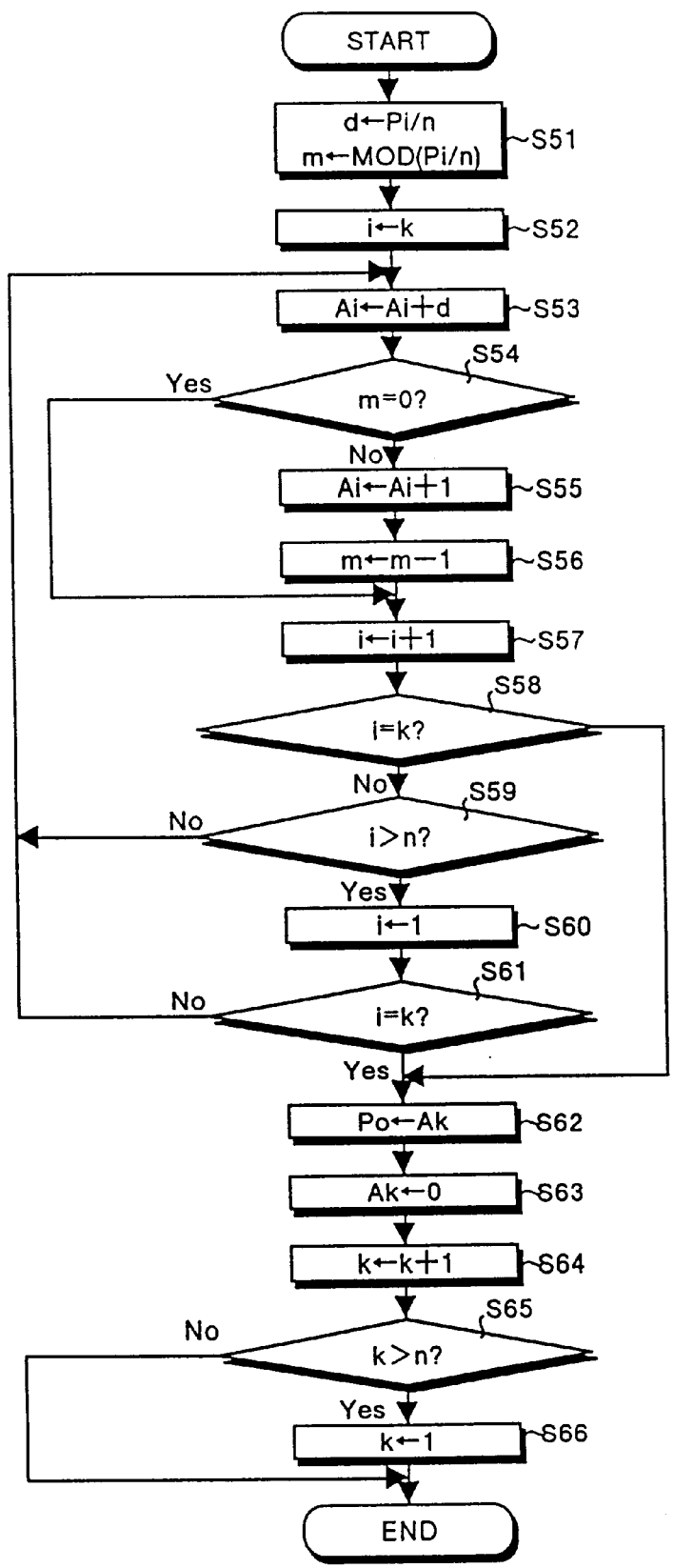
FIG. 12 is a flowchart showing speed increasing or decreasing control in the numerical control apparatus according to the present invention.

FIG. 12 shows the speed increasing/decreasing control routine. First, the input pulse speed (the number of input pulses per interpolation period) Pi is divided by the previously set division number n, and then, the resultant value is substituted for a variable d. Furthermore, a remainder produced by the division is substituted for the variable m (step S51). Here, the variables d and m are integers and always satisfy the relationship Pi=d×n+m.

Next, the variable k is substituted for the variable i (step S52).

Subsequently, the variable d is added to the ring buffer Ai (step S53).

Thereafter, it is judged whether or not the variable m is equal to zero that is, there is any remainder (step S54). If the variable m is equal to zero, the routine jumps to step S57. If there is a remainder, 1 is added to the ring buffer Ai (step S55), and then, the variable m is decremented by 1 (step S56).

The process from step S54 to step S56 is executed to distribute the remainder m to first m pulses out of the n pulses.

Upon completion of the distribution of the remainder m, the variable i is incremented by 1 (step S57), and then, it is judged whether or not the variable i is equal to the variable k (step S58). The fact that the variable i is equal to the variable k signifies completion of the addition. If the variable i is equal to the variable k, the routine jumps to step S62; otherwise, the routine proceeds to step S59.

Next, it is judged whether or not the variable i is greater than the division number n (step S59). If the variable i is smaller than the division number n, the routine returns to step S53. In step S53, if it is judged that the variable i is greater than the division number n, the variable i is returned to 1 (step S60), and then, it is judged whether or not the variable i is equal to the variable k (step S61). Also in this case, the fact that the variable i is equal to the variable k signifies the completion of the addition. If it is judged that the variable i is equal to the variable k, the routine proceeds to step S62; otherwise, the routine returns to step S53.

In step S62, a value of a ring buffer Ak is set to the variable Po. This represents the output pulse speed. Subsequently, the value of the ring buffer Ak is cleared to zero (step S63), and then, the variable k is incremented by 1 (step S64).

Thereafter, it is judged whether or not the variable k is greater than the division number n (step S65). If the variable k is not greater than the division number n, the routine comes to end at once; in contrast, if the variable k is greater than the division number n, the variable k is returned to 1, and then, the routine comes to end.

Figures 13, 14:
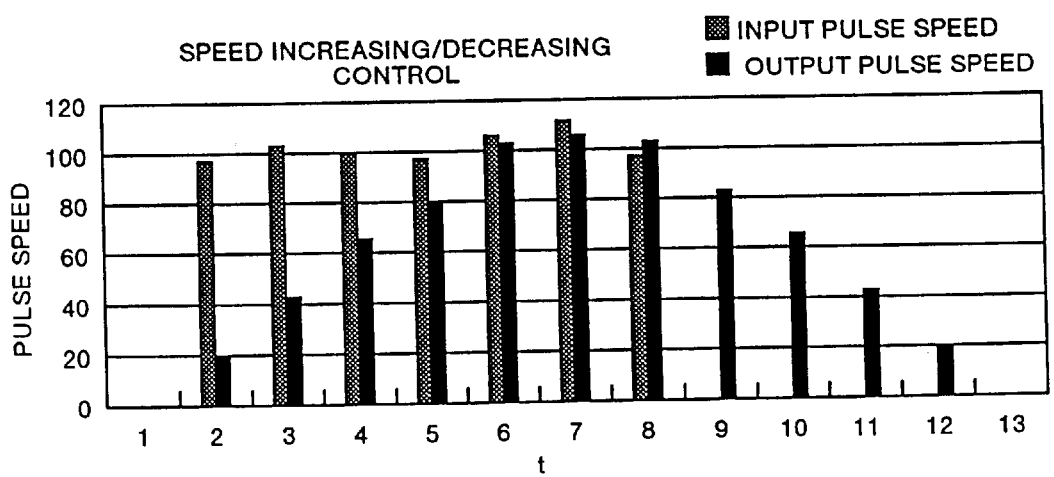
FIG. 13 is a numerical graph showing an example of conversion calculation of an input pulse speed and an output pulse speed, which is performed by the speed increasing or decreasing control.
FIG. 14 is a bar graph showing the relationship between the input pulse speed and the output pulse speed in the speed increasing or decreasing control.

FIG. 13 shows an example of the conversion calculation of the input pulse speed and the output pulse speed, which is performed by the above-described speed increasing/ decreasing control. FIG. 14 is a bar graph showing the example. As described above, the input pulse speed is increased or decreased, so that the output pulse speed can be smoothly increased or decreased with respect to even an abrupt increase/decrease in input pulse speed. Consequently, the handle can be fed according to the increasing/decreasing pattern of the smooth feeding speed, thereby achieving the handle operation without imparting any shock to the machine tool.

Figures 15, 16:
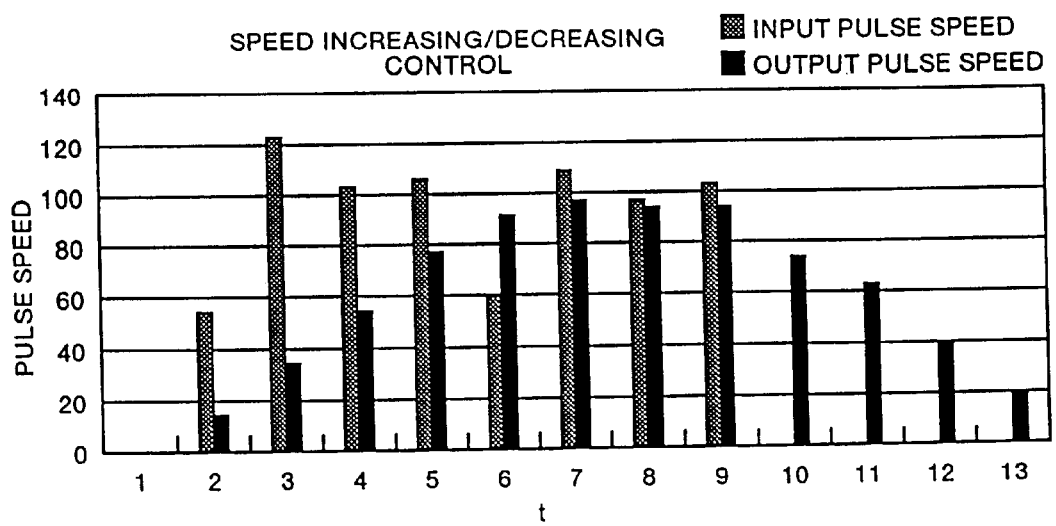
FIG. 15 is a numerical graph showing another example of conversion calculation of an input pulse speed and an output pulse speed, which is performed by the speed increasing or decreasing control.
FIG. 16 is a bar graph showing the relationship between the input pulse speed and the output pulse speed in the speed increasing or decreasing control.

FIG. 15 shows another example of conversion calculation of the input pulse speed and the output pulse speed in the case where the handle feeding speed of the manual handle 35 of the manual pulse generator 34 is varied due to an artificial operation, and FIG. 16 is a bar graph showing the example.

As described above, even if the input pulse speed is varied (surged), the output pulse speed can be smoothed by the speed increasing/decreasing control, thus achieving the smooth feeding speed.

Figures 17, 18:
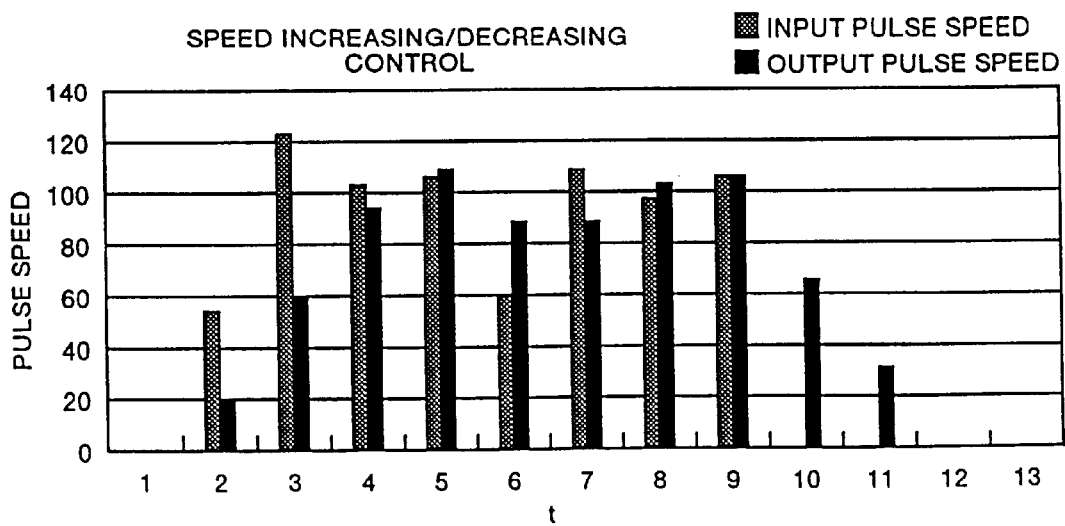
FIG. 17 is a numerical graph showing still another example of conversion calculation of an input pulse speed and an output pulse speed, which is performed by the speed increasing or decreasing control.
FIG. 18 is a bar graph showing the relationship between the input pulse speed and the output pulse speed in the speed increasing or decreasing control.

FIG. 17 shows a still another example of conversion calculation of the input pulse speed and the output pulse speed in the case where utterly the same input pattern of the pulse speed as that shown in FIGS. 13 and 14 is subjected to the speed increasing/decreasing control with the division number of 3, and FIG. 18 is a bar graph showing the example. The division number n can be set to an optimum value according to the characteristics or machining operation of the machine tool, and then, the speed increasing/ decreasing control is performed.

INDUSTRIAL APPLICABILITY

The present invention can be applied to the handle feeding in various kinds of numerically controlled machine tools.

What is claimed is:

1. A handle feeding control method in a numerical control apparatus in which a control axis can be controlled in response to a pulse signal output from a manual pulse generator for generating the pulse signal according to the turning quantity of a manual handle so as to perform handle feeding, the method comprising the steps of:

dividing by n the number of pulses per interpolation period of a pulse signal output from said manual pulse generator per interpolation period, wherein n is an integer greater than or equal to 2;

distributing and outputting the division number of pulses to the interpolation period at the time of inputting of the pulse signal and for n−1 interpolation periods following the time of inputting the pulse signal; and providing the handle feeding with speed increasing/decreasing characteristics.

2. The handle feeding control method according to claim 1, wherein a remainder m, which is an integer smaller than n, produced by dividing by n the number of pulses per interpolation period is output in such a manner as to be respectively distributed to the m interpolation periods out of the n interpolation periods.

3. The handle feeding control method according to claim 1, wherein the division number n of pulses can be arbitrarily varied and set by an operator.

4. The handle feeding control method according to claim 1, wherein the division number n of pulses is an integer obtained by dividing the clamp pulse speed by an allowable maximum increased/decreased speed.

5. A numerical control apparatus in which a control axis can be controlled in response to a pulse signal output from a manual pulse generator for generating the pulse signal according to the turning quantity of a manual handle so as to perform handle feeding, said apparatus comprising:

a speed increasing/decreasing controller for dividing by n the number of pulses per interpolation period of a pulse signal output from said manual pulse generator per interpolation period, wherein n is an integer greater than or equal to 2, distributing and outputting the division number of pulses to the interpolation period at the time of inputting of the pulse signal and for n−1 interpolation periods following the time of inputting the pulse signal, and then, providing the handle feeding with speed increasing/decreasing characteristics.

6. The numerical control apparatus according to claim 5, wherein said speed increasing/decreasing controller outputs a remainder m, which is an integer smaller than n, produced by dividing by n the number of pulses per interpolation period in such a manner as to be respectively distributed to the m interpolation periods out of the n interpolation periods.

7. The numerical control apparatus according to claim 5, wherein the division number n of pulses can be arbitrarily varied and set by an operator.

8. The numerical control apparatus according to claim 5, wherein the division number n of pulses is an integer obtained by dividing the clamp pulse speed by an allowable maximum increased/decreased speed.

\* \* \* \* \*